(12) United States Patent
Hága et al.

(10) Patent No.: US 12,055,650 B2
(45) Date of Patent: Aug. 6, 2024

(54) TECHNIQUE FOR DETERMINING A RELATIVE POSITION BETWEEN VEHICLES

(71) Applicant: Telefonaktiebolaget LM Ericsson (publ), Stockholm (SE)

(72) Inventors: Péter Hága, Budapest (HU); Zsófia Kallus, Budapest (HU); Tamas Borsos, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 332 days.

(21) Appl. No.: 17/629,636

(22) PCT Filed: Jul. 30, 2019

(86) PCT No.: PCT/EP2019/070484
§ 371 (c)(1),
(2) Date: Jan. 24, 2022

(87) PCT Pub. No.: WO2021/018385
PCT Pub. Date: Feb. 4, 2021

(65) Prior Publication Data
US 2022/0221550 A1   Jul. 14, 2022

(51) Int. Cl.
*G01S 5/14*    (2006.01)
*B60W 30/165*  (2020.01)
(Continued)

(52) U.S. Cl.
CPC ......... *G01S 5/0284* (2013.01); *B60W 30/165* (2013.01); *B60W 50/029* (2013.01);
(Continued)

(58) Field of Classification Search
CPC ...... G01S 5/14; G01S 5/0284; G01S 13/0209; G01S 13/08; G05D 1/028; G05D 1/0293;
(Continued)

(56) References Cited

U.S. PATENT DOCUMENTS

2012/0112895 A1   5/2012  Jun
2017/0242443 A1   8/2017  Schuh et al.
(Continued)

FOREIGN PATENT DOCUMENTS

EP   B495836 A1    6/2019
JP   2011210250 A  10/2011
(Continued)

*Primary Examiner* — Harry K Liu
(74) *Attorney, Agent, or Firm* — Murphy, Bilak & Homiller, PLLC (57) ABSTRACT

A technique for determining a relative position of a preceding vehicle with respect to a succeeding vehicle in a vehicle platoon is disclosed, wherein the succeeding vehicle comprises at least two front tags and the preceding vehicle comprises at least two back tags, the front and back tags being configured to perform ranging measurements among each other using radio technology. A method implementation of the technique comprises determining (S202) pairwise distances between the front and back tags using ranging measurements performed by the front and back tags using the radio technology, and determining (S204) the relative position of the preceding vehicle with respect to the succeeding vehicle based on the determined pairwise distances.

20 Claims, 5 Drawing Sheets

(51) Int. Cl.
  *B60W 50/029* (2012.01)
  *B60W 50/14* (2020.01)
  *G01S 5/02* (2010.01)
  *G01S 13/02* (2006.01)
  *G01S 13/08* (2006.01)
  *G05D 1/00* (2006.01)

(52) U.S. Cl.
  CPC .............. *B60W 50/14* (2013.01); *G01S 5/14* (2013.01); *G01S 13/0209* (2013.01); *G01S 13/08* (2013.01); *G05D 1/028* (2013.01); *G05D 1/0293* (2013.01); *B60W 2050/0292* (2013.01); *B60W 2420/408* (2024.01); *B60W 2554/4041* (2020.02); *B60W 2554/80* (2020.02)

(58) Field of Classification Search
  CPC ... B60W 30/165; B60W 50/029; B60W 50/14
  USPC ....................................... 342/458
  See application file for complete search history.

(56) References Cited

U.S. PATENT DOCUMENTS

| | | |
|---|---|---|
| 2018/0188745 A1 | 7/2018 | Pilkington |
| 2018/0348791 A1 | 12/2018 | Hendrickson et al. |

FOREIGN PATENT DOCUMENTS

| | | | | |
|---|---|---|---|---|
| JP | 2019016825 A | * | 1/2019 | ............ B60K 35/00 |
| WO | 2018038964 A1 | | 3/2018 | |
| WO | 2018217219 A1 | | 11/2018 | |

* cited by examiner

ΔL_F: constant distance between front tag pair
ΔL_B: constant distance between back tag pair
········ Ranging between a front tag and a back tag of platooning vehicles

TECHNIQUE FOR DETERMINING A RELATIVE POSITION BETWEEN VEHICLES

TECHNICAL FIELD

The present disclosure generally relates to vehicle platoons. In particular, a technique for determining a relative position of a preceding vehicle with respect to a succeeding vehicle in a vehicle platoon is presented. The technique may be embodied in methods, computer programs, apparatuses and systems.

BACKGROUND

In the automotive and transport industry, vehicle platooning is used to achieve efficiency gains and reductions in energy consumption during the driving of vehicles. Studies have shown that, by moving multiple vehicles in a platoon while keeping their relative positions tightly in line with the respective vehicles driving in front of them, aerodynamic gains of reduced resistance of approximately 9% may be achieved, and even the first vehicle of the platoon may benefit with a gain of approximately 7% in energy consumption.

State-of-the-art solutions for vehicle platooning concentrate on forming platoons from individual vehicles by dynamically controlling their relative geometry, including their distances and relative positions, irrespectively of their global position on a route. Various techniques are available to perform the required gap measurements between the vehicles and the challenges of gap control are generally manifold. These techniques may be based on video (i.e., a camera), light detecting and ranging (LIDAR) or radar, for example, and their main concern relates to the ability to reliably recognize a vehicle in front in order to keep the line during movement. Other well studied technologies include global positioning system (GPS) based techniques or vehicle-to-vehicle (V2V) communication protocols for high-performance and high-reliability platooning that may be used for inter-vehicle communication to optimize the distance between the vehicles, or other applications including emission control, driver assistance and automatic driving during platooning, for example.

Existing solutions for inferring the gap between vehicles (e.g., trucks) following each other may have drawbacks that make the estimation of accurate relative positions or simple distances between preceding and succeeding vehicles challenging. For example, GPS positioning may not provide high enough accuracy and may not be available in certain types of environments, such as in tunnels and canyons or between high buildings. Although radar or LIDAR based techniques may accurately scan the area in front of a vehicle, the resulting image still requires feature extraction which may be challenging in platooning use cases. Extraction of points used for representation of a vehicle in front may further be complicated by different shapes and surfaces of the vehicles, such as varying truck loads, for example. The scanning quality may also be deteriorated by changing weather conditions, such as by heavy rain or snow. Camera based solutions may likewise need to cope with challenges when extracting features from images. Without depth information, the training of image processing algorithms may be costly as extensive training may be required, and the solutions may suffer from the inherent limitations of optical sensors, such as distortions, sensitivity to weather conditions or sudden changes in light conditions, for example. The latter may even lead to dangerous situations when the vehicle in the back leaves a shadow casted by a turning front vehicle so that sudden full exposure may blind the camera sensor, leaving the back vehicle without critical platooning information for a short while.

SUMMARY

Accordingly, there is a need for a technique for determining a relative position between vehicles in a vehicle platoon which avoids one or more of the problems discussed above, or other problems.

According to a first aspect, a method for determining a relative position of a preceding vehicle with respect to a succeeding vehicle in a vehicle platoon is provided. The succeeding vehicle comprises at least two front tags and the preceding vehicle comprises at least two back tags, the front and back tags being configured to perform ranging measurements among each other using radio technology. The method comprises determining pairwise distances between the front and back tags using ranging measurements performed by the front and back tags using the radio technology, and determining the relative position of the preceding vehicle with respect to the succeeding vehicle based on the determined pairwise distances.

Determining the relative position of the preceding vehicle with respect to the succeeding vehicle may include creating a graph based on the determined pairwise distances and determining the relative position based on a geometry of the graph. The front tags may be installed at the succeeding vehicle according to a first geometrical arrangement with predefined relative positions of the front tags and the back tags may be installed at the preceding vehicle according to a second geometrical arrangement with predefined relative positions of the back tags. Each of the front tags may store information regarding its position in the first geometrical arrangement of the succeeding vehicle and each of the back tags may store information regarding its position in the second geometrical arrangement of the preceding vehicle. Each of the front and back tags may store information regarding at least one of a unique identifier of the respective tag, a role of the respective tag, and the vehicle at which the respective tag is installed. The method may further comprise configuring the front tags and/or the back tags to broadcast the information stored on the respective tag using the radio technology. The method may further comprise generating a list of visible tags among the front and back tags from which the broadcasted information is received, wherein the relative position of the preceding vehicle with respect to the succeeding vehicle may be determined based on the pairwise distances among the visible tags. The list of visible tags may be filtered to exclude tags of detected vehicles other than the preceding vehicle and the succeeding vehicle.

The ranging measurements between the front and back tags may be performed using UWB radio technology. The front and back tags may report their ranging measurements using the radio technology. The ranging measurements may be triggered by the front tags of the succeeding vehicle. Determining the relative position of the preceding vehicle with respect to the succeeding vehicle based on the determined pairwise distances may be performed repeatedly to monitor the relative position over time. The method may further comprise providing a feed reflecting changes of the relative position of the preceding vehicle with respect to the succeeding vehicle over time to a monitoring component. The monitoring component may be configured to generate an alert upon detecting that the relative position of the preceding vehicle with respect to the succeeding vehicle is abnormal. The monitoring component may be configured to control at least one of the preceding vehicle and the succeeding vehicle to perform an action upon detecting that the relative position of the preceding vehicle with respect to the succeeding vehicle is abnormal. At least one of the preceding vehicle and the succeeding vehicle may be a self-driving vehicle.

A frequency of determining the relative position of the preceding vehicle with respect to the succeeding vehicle may be adapted depending on at least one of a current speed of at least one of the preceding vehicle and the succeeding vehicle, a current road situation affecting at least one of the preceding vehicle and the succeeding vehicle, a driver profile of a driver of at least one of the preceding vehicle and the succeeding vehicle, and a configuration prescribed by a monitoring component. The method may be performed by an on-board computing unit of one of the preceding vehicle and the succeeding vehicle. The method may also be performed by a computing unit provided in a cloud computing environment. An on-board computing unit of at least one of the preceding vehicle and the succeeding vehicle may in this case be provided as fallback computing unit configured to perform the method in case of a failure of the computing unit provided in the cloud computing environment.

According to a second aspect, a computer program product is provided. The computer program product comprises program code portions for performing the method of the first aspect when the computer program product is executed on one or more computing devices (e.g., a processor or a distributed set of processors). The computer program product may be stored on a computer readable recording medium, such as a semiconductor memory, DVD, CD-ROM, and so on.

According to a third aspect, a computing unit for determining a relative position of a preceding vehicle with respect to a succeeding vehicle in a vehicle platoon is provided, wherein the succeeding vehicle comprises at least two front tags and the preceding vehicle comprises at least two back tags, the front and back tags being configured to perform ranging measurements among each other using radio technology. The computing unit comprises at least one processor and at least one memory, wherein the at least one memory contains instructions executable by the at least one processor such that the computing unit is operable to perform any of the method steps presented herein with respect to the first aspect.

According to a fourth aspect, there is provided a system comprising a computing unit according to the third aspect.

BRIEF DESCRIPTION OF THE DRAWINGS

Implementations of the technique presented herein are described herein below with reference to the accompanying drawings, in which.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figure 1:
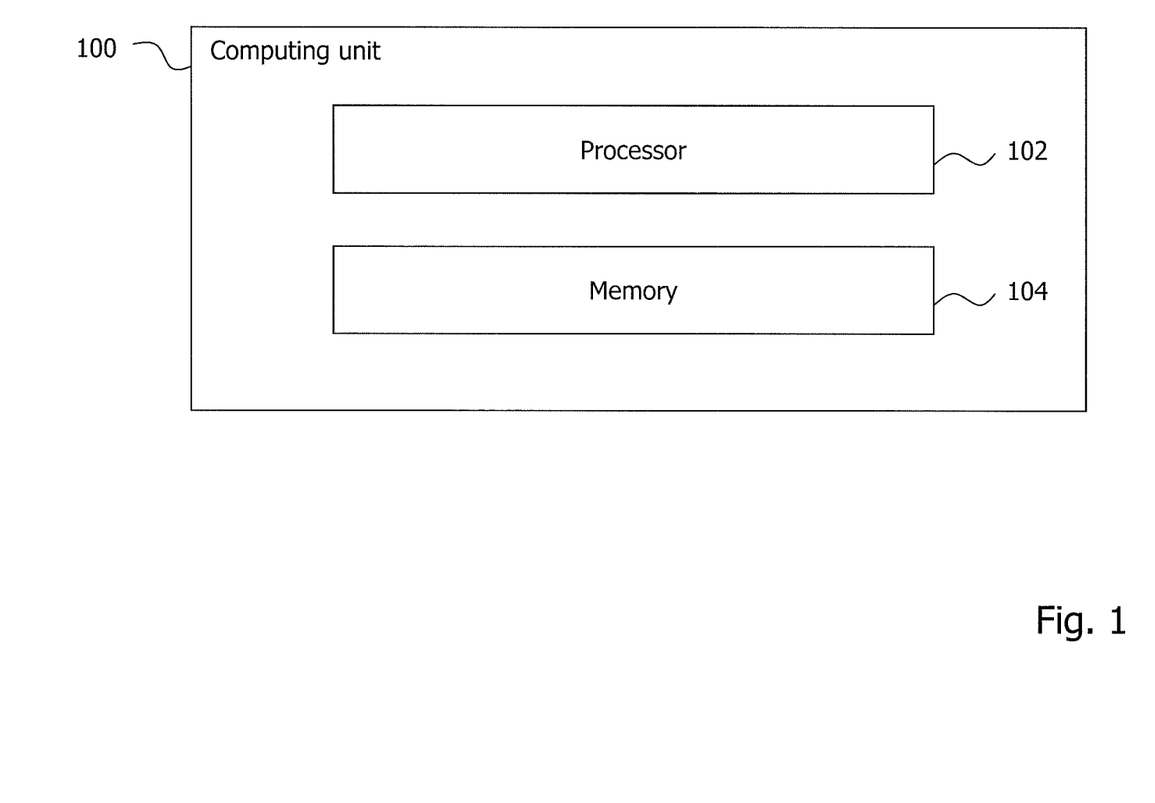
FIG. 1 illustrates an exemplary composition of a computing unit for determining a relative position of a preceding vehicle with respect to a succeeding vehicle in a vehicle platoon according to the present disclosure.

FIG. 1 schematically illustrates an exemplary composition of a computing unit 100 for determining a relative position of a preceding vehicle with respect to a succeeding vehicle in a vehicle platoon. The succeeding vehicle comprises at least two front tags and the preceding vehicle comprises at least two back tags, wherein the front and back tags are configured to perform ranging measurements among each other using radio technology. The computing unit 100 comprises at least one processor 102 and at least one memory 104, wherein the at least one memory 104 contains instructions executable by the at least one processor 102 such that the computing unit 100 is operable to carry out the method steps described herein below.

It will be understood that the computing unit 100 may be implemented on a physical computing unit or a virtualized computing unit, such as a virtual machine, for example. It will further be appreciated that the computing unit 100 may not necessarily be implemented on a standalone computing unit, but may be implemented as components—realized in software and/or hardware—residing on multiple distributed computing units as well, such as in a cloud computing environment, for example.

Figure 2:
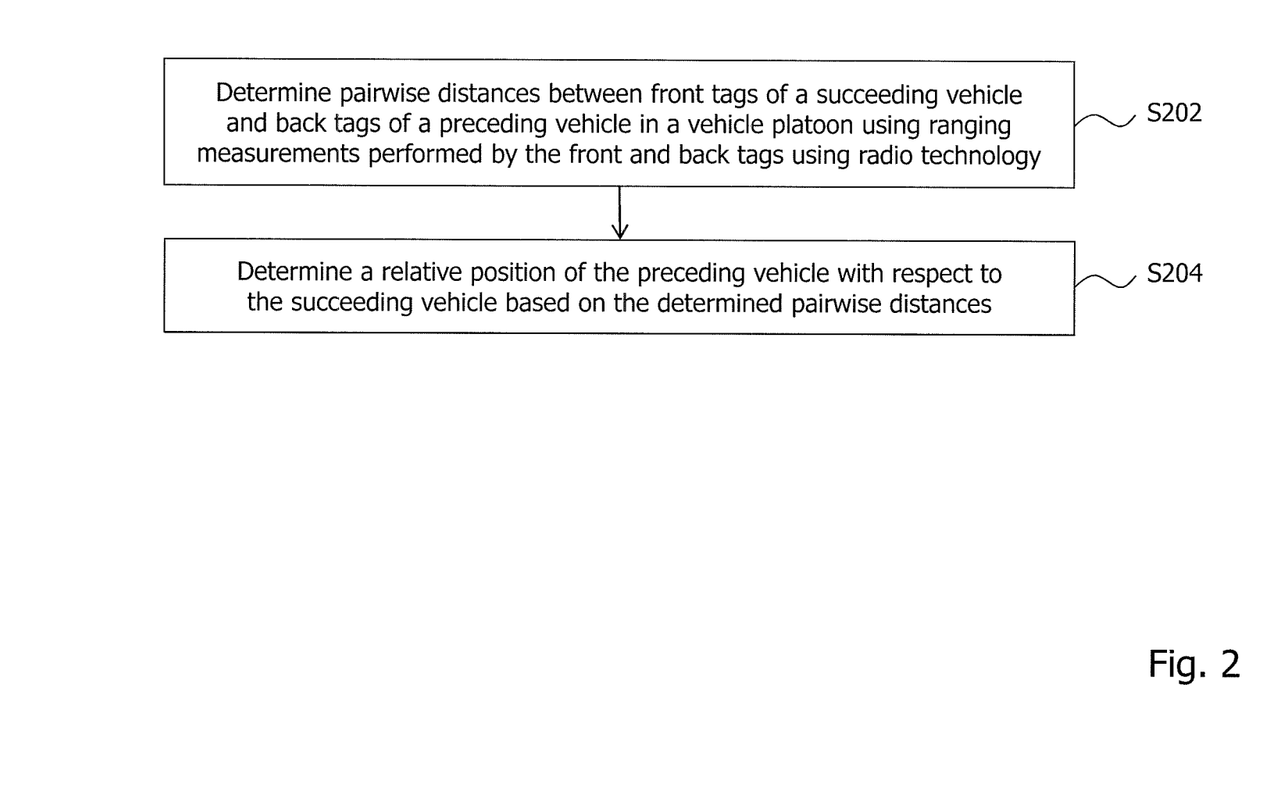
FIG. 2 illustrates a method which may be performed by the computing unit according to the present disclosure.

FIG. 2 illustrates a method which may be performed by the computing unit 100 according to the present disclosure. The method is dedicated to determining a relative position of a preceding vehicle with respect to a succeeding vehicle in a vehicle platoon. The succeeding vehicle comprises at least two front tags and the preceding vehicle comprises at least two back tags, the front and back tags being configured to perform ranging measurements among each other using radio technology. In step S202, the computing unit 100 may determine pairwise distances between the front and back tags using ranging measurements performed by the front and back tags using the radio technology. In step S204, the computing unit 100 may determine the relative position of the preceding vehicle with respect to the succeeding vehicle based on the determined pairwise distances.

The method may thus allow determining a relative position between two vehicles that (directly) follow each other in a vehicle platoon. The vehicle platoon may be a convoy (or "line") of at least two vehicles that follow each other while driving, wherein, among two successive vehicles in the vehicle platoon, the leading (or "front") vehicle is generally referred to herein as the "preceding vehicle" and the following (or "subsequent") vehicle is generally referred to as the "succeeding vehicle". The vehicles driving in the vehicle platoon may correspond to any type of vehicles, such trucks or cars, for example.

To be able to determine the relative position of the preceding vehicle with respect to the succeeding vehicle, both vehicles may be equipped with respective tags that allow determining distances therebetween, based on which the relative position between the two vehicles may be derived. The tags may be configured to perform ranging measurements using radio technology to determine such distances. For example, the tags may communicate using radio signals to perform two-way timing measurements of the time the signals travel between the tags to thereby measure the distance therebetween. To this end, known ranging protocols may be used, such as Two Way Ranging (TWR), for example.

To determine the relative geometry (and, thus, the relative position) between the preceding vehicle and the succeeding vehicle, at least two tags may be disposed (or "mounted") at the preceding vehicle and at least two tags may be disposed at the succeeding vehicle. As the tags of the succeeding vehicle may perform ranging measurements with the tags of the vehicle in the front and may thus preferably be disposed at a front portion of the succeeding vehicle, the tags of the succeeding vehicle are generally be referred to herein as "front tags" and, as the tags of the preceding vehicle may perform ranging measurements with the tags of the vehicle in the back and may thus preferably be disposed at a back portion of the preceding vehicle, the tags of the preceding vehicle are generally referred to herein as "back tags". Disposing the tags on the respective end portions of the vehicles in this manner may enable a dynamic and flexible line forming logic where platoons may be created without a priori knowledge of the order of the participating vehicles. It will be understood that the front and back tags do not necessarily have to be disposed at the very front and back ends of the vehicles, but can generally be disposed at any portions of the vehicles that allow performing ranging measurements to determine respective distances between the vehicles, as described above.

Determining the relative position of the preceding vehicle with respect to the succeeding vehicle may include performing a spatial analysis based on the pairwise distances determined between the front and back tags, wherein the spatial analysis may include a two-dimensional geometrical analysis or a three-dimensional geometrical analysis based on the pairwise distances, for example. For a three-dimensional geometrical analysis, more than two front tags and more than two back tags may be installed at the respective vehicles. Given that the positions of the tags at the respective vehicles are generally known, the relative position between the vehicles may be derived in consideration of the known positions of the tags at the respective vehicles, e.g., by performing the spatial analysis based on the pairwise distances in consideration of the known positions of the tags. In one variant, the spatial analysis may be performed using a (e.g., imaginary) graph. Determining the relative position of the preceding vehicle with respect to the succeeding vehicle may thus include determining a graph based on the determined pairwise distances and determining the relative position based on a geometry of the graph.

The tags may be installed at the respective vehicles according to a predefined geometrical layout with known relative positions that may be used in calculating the relative geometry between the vehicles. The front tags may as such be installed at the succeeding vehicle according to a first geometrical arrangement with predefined relative positions of the front tags and the back tags may be installed at the preceding vehicle according to a second geometrical arrangement with predefined relative positions of the back tags. The known relative positions according to the first and second geometrical arrangements may be taken as given in the calculation of the relative geometry and only the pairwise distances between the front tags and the back tags may need to be determined. In other words, each front tag of the succeeding vehicle may perform ranging measurements with each back tags of the preceding vehicle, and vice versa.

For illustrative purposes, reference is made in the following to FIGS. 3, 4a and 4b which show exemplary implementations that elucidate how the relative position between two vehicles of a vehicle platoon may be determined based on the pairwise distances determined using measurements between the front and back tags.

Figure 3:
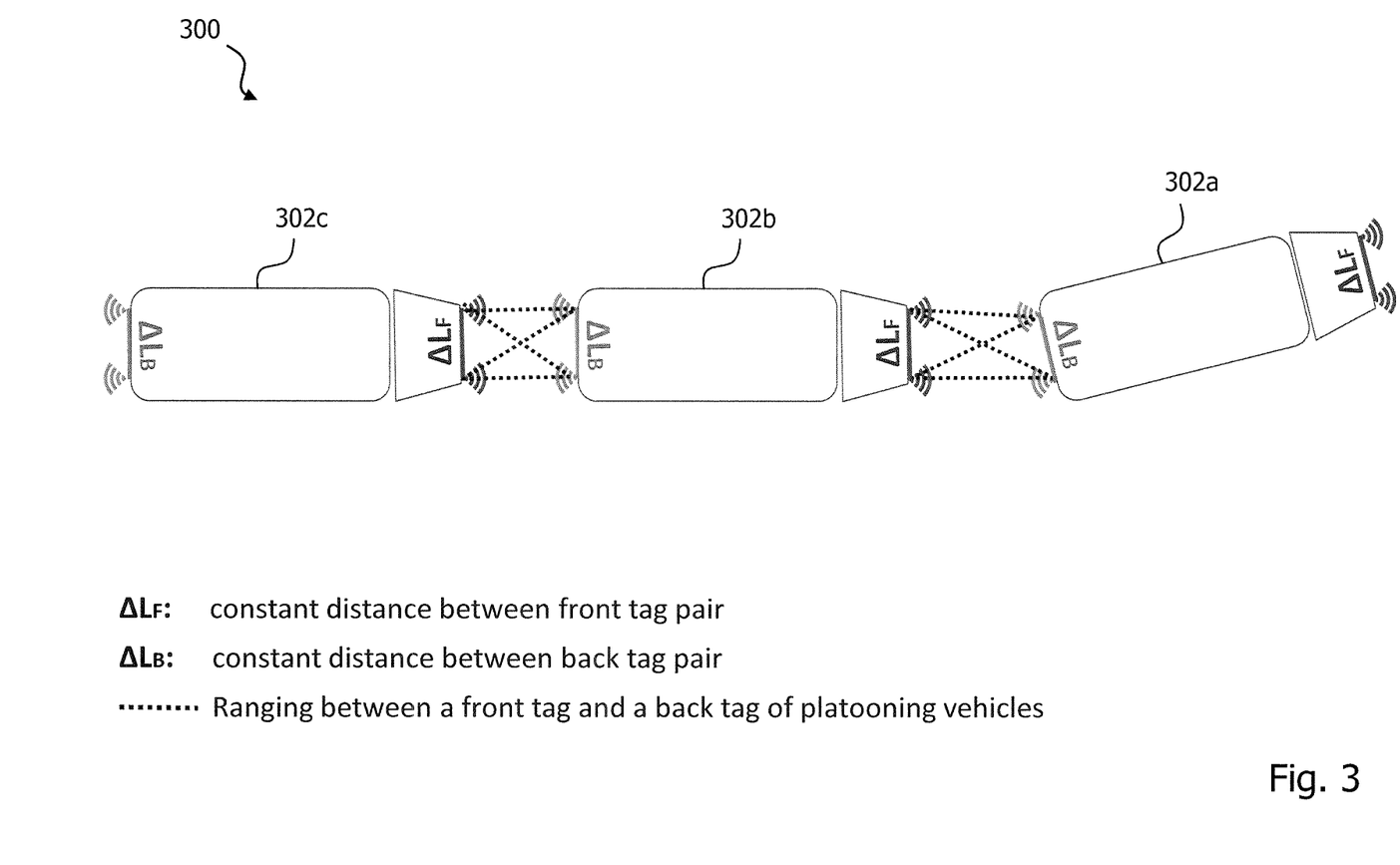
FIG. 3 illustrates an exemplary vehicle platoon comprising three vehicles that implement the technique according to the present disclosure.

FIG. 3 schematically illustrates a vehicle platoon 300 which comprises three vehicles 302, exemplarily indicated as trucks 302a, 302b and 302c, each of which is equipped with a pair of front tags and a pair of black tags that are configured to perform ranging measurements between each other. The front tags are disposed at the front of each vehicle 302 and the back tags are disposed at the rear of each vehicle 302. The distances between the front tags of each vehicle 302 are fixed and have known values $\Delta L_F$ which are marked by solid lines in the figure. Likewise, the distances between the back tags of each vehicle 302 are fixed and have known values $\Delta L_B$. Ranging measurements performed between the front and back tags of two successive vehicles 302 are marked by dotted lines in the figure. As can be seen, while the geometry of the pairwise distances between the vehicles 302b and 302c generally forms a rectangular shape which indicates that the vehicles are heading in the same direction, the geometry of the pairwise distances between the vehicles 302a and 302b forms a slightly distorted quadrilateral shape which indicates that the vehicle 302a currently performs a left turn with respect to the vehicle 302b.

Figure 4A:
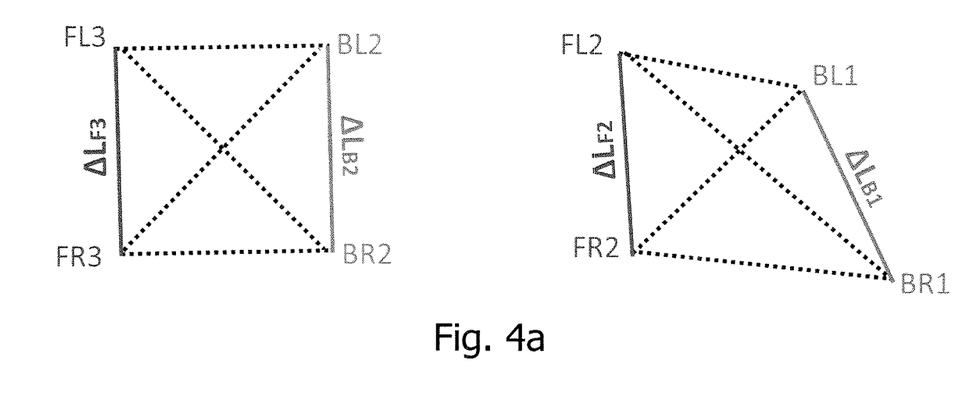
FIGS. 4a and 4b illustrate exemplary detailed views of pairwise distances determined between front and back tags of successive vehicles according to the present disclosure.
Figure 4B:
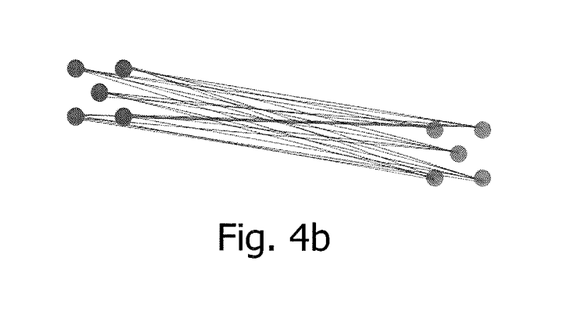

FIG. 4a shows the ranging geometries of FIG. 3 in more detail. The left portion of FIG. 4a illustrates the ranging geometry between the vehicles 302b and 302c, wherein the back tags disposed on the left side and the right side of the vehicle 302b are denoted as BL2 and BR2 and their fixed and known distance is denoted as $\Delta L_{B2}$. Similarly, the front tags disposed on the left side and the right side of the vehicle 302c are denoted as FL3 and FR3 and their fixed and known distance is denoted as $\Delta L_{F3}$. As shown, the tags BL2, BR2, FL3 and FR3 form a rectangular shape which implies that the vehicles 302b and 302c drive into the same direction. The right portion of FIG. 4a, on the other hand, illustrates the ranging geometry between the vehicles 302a and 302b, wherein the back tags disposed on the left side and the right side of the vehicle 302a are denoted as BL1 and BR1 and their fixed and known distance is denoted as $\Delta L_{B1}$. Similarly, the front tags disposed on the left side and the right side of the vehicle 302b are denoted as FL2 and FR2 and their fixed and known distance is denoted as $\Delta L_{F2}$. As shown, the tags BL1, BR1, FL2 and FR2 form a slightly distorted quadrilateral shape which implies that the vehicle 302a makes a left turn with respect to the vehicle 302b.

Based on the determined pairwise distances between the front and back tags of the vehicles 302a and 302b, the relative geometry (and, thus, the relative position) between the vehicles 302a and 302b may be determined. For example, by comparing the length of the left and right distances (i.e., the distance from FL2 to BL1 and the distance from FR2 to BR1, respectively) and, optionally, considering the difference between the values of $\Delta L_{B1}$ and $\Delta L_{F2}$, the relative left turn of the vehicle 302*a* may be detected. In other words, starting from a complete alignment where the left and right distances are equal (such as in case of the left portion of FIG. 4*a*), changes to a smaller left distance and/or a larger right distance may be indicative of a left turn. The same logic may be applied vice versa for the detection of rights turns, for example.

While the examples of FIGS. 3 and 4*a* generally relate to a two-dimensional spatial analysis which is based on pairs of front tags and pairs of back tags installed at the respective vehicles, it will be understood that the provision of more than two front tags and more than two back tags at each vehicle (e.g., at different altitudes) may be used to enable performing a three-dimensional spatial analysis based on the determined pairwise distances between the tags. Additional front and back tags may also be used to decrease the uncertainty of single distance measurements, e.g., when the tags are provided in clusters. Such situation is exemplarily illustrated in FIG. 4*b*, which shows an implementation where a cluster of front tags and a cluster of back tags are in place at the respective vehicles, wherein, when the ranging measurements are performed between all tags of the clusters, an average may be taken to decrease the uncertainty of a single distance measurement, for example.

As said, the front tags may be installed at the succeeding vehicle according to a first geometrical arrangement with predefined relative positions of the front tags and the back tags may be installed at the preceding vehicle according to a second geometrical arrangement with predefined relative positions of the tags. In one implementation, information regarding the relative positions and geometry may be stored on the respective tags themselves (e.g., the exact position of the respective tag at the vehicle and its fixed and local distances to the other tags at the same vehicle) and the tags may be configured to broadcast (e.g., at regular intervals) this information using the radio technology to thereby allow vehicles in the vicinity to detect the presence of the tags and to learn about the possibility to perform ranging measurements with them. In one variant, each (or at least one) of the front tags may thus store information regarding its position in the first geometrical arrangement of the succeeding vehicle and each (or at least one) of the back tags may store information regarding its position in the second geometrical arrangement of the preceding vehicle.

In addition, the tags may store supplementary information about themselves and the vehicles they are attached to, such as a tag identifier, a tag role (e.g., indicating whether the respective tag is a front tag or a back tag) and meta information about the vehicle (e.g., the type of vehicle and the vehicle platoon it drives in). Each (or at least one) of the front and back tags may thus store information regarding at least one of a unique identifier of the respective tag, a role of the respective tag, and the vehicle at which the respective tag is installed. The tags may comprise a radio chip with an integrated microcontroller and memory to enable storage of the information and (dynamic) configuration and control of the communication between the tags.

In order to trigger that the front and back tags broadcast the information stored on the respective tag, the method performed by the computing unit 100 may further comprise configuring the front tags and/or the back tags to broadcast the information stored in the respective tag using the radio technology. Tags installed on other vehicles driving in the vehicle platoon may receive the broadcasted information and, based on the collected information, a list of visible tags may be generated for each vehicle in the platoon, enabling the vehicles to learn about the tags in their vicinity to perform ranging measurements with and to determine the pairwise distances for the relative position between the vehicles, as described above. A preceding vehicle may thus detect the front tags of a succeeding vehicle and a succeeding vehicle may detect the back tags of a preceding vehicle of the platoon, so that dynamic and flexible line forming in the platoon is generally made possible. The method performed by the computing unit 100 may as such further comprise generating a list of visible tags among the front and back tags from which the broadcasted information is received, wherein the relative position of the preceding vehicle with respect to the succeeding vehicle may be determined based on the pairwise distances among the visible tags.

In order to avoid including false tags into the list of tags to be considered for the determination of the relative position (e.g., tags of an overtaking vehicle may be visible but should not be included in the measurements and, if applicable, the resulting graph), tags that do not belong to vehicles in the platoon may be removed from the list of tags. The list of visible tags may thus be filtered to exclude tags of detected vehicles other than the preceding vehicle and the succeeding vehicle, for example.

The ranging measurements between the front and back tags may be performed using UWB radio technology, which generally allows radio measurements with centimeter level accuracy and may therefore enable determining the relative position between the vehicles with high precision. The same technology may be used by the tags to report the results of the ranging measurements, e.g., to a gateway component provided at the vehicle, to thereby forward the measurement results to a component, such as the computing unit 100, which determines the relative position between the vehicles based on the pairwise distances between the front and back tags, as described above. As a mere example, the tags may comprise a Decawave DW1000 UWB radio chip with a microcontroller which may enable performing both the ranging measurements and the reporting using UWB radio technology.

In one variant, the ranging measurements may be triggered by the front tags of the succeeding vehicle, e.g., when the succeeding vehicle is responsible for monitoring the relative position of the preceding vehicle with respect to the succeeding vehicle. It will be understood that, when the preceding vehicle is responsible for monitoring the relative position between the preceding vehicle and the succeeding vehicle, the ranging measurements may be triggered by the back tags of the preceding vehicle as well. In some variants, the decision whether a vehicle is a vehicle that triggers the ranging measurements may be made dynamically, e.g., based on certain communication between the two successive vehicles in accordance with a predefined protocol, for example.

Determining the relative position of the preceding vehicle with respect to the succeeding vehicle based on the determined pairwise distances may be performed repeatedly to monitor the relative position over time, to thereby enable (e.g., real-time) monitoring of the relative positions between vehicles following each other in the vehicle platoon. Based on the repeatedly monitored relative positions, a monitoring feed may be output that may be used to take (e.g., preventive or corrective) actions if certain conditions are detected. The method performed by the computing unit 100 may thus further comprise providing a (e.g., real-time) feed reflecting changes of the relative position of the preceding vehicle with respect to the succeeding vehicle over time to a monitoring component. The monitoring component may be configured to generate an alert upon detecting that the relative position of the preceding vehicle with respect to the succeeding vehicle is abnormal (or, more generally, satisfies a certain predefined condition indicative of an undesired situation).

In order to take corrective or preventive action, the monitoring component may be configured to control at least one of the preceding vehicle and the succeeding vehicle to perform an action upon detecting that the relative position of the preceding vehicle with respect to the succeeding vehicle is abnormal (or, more generally, satisfies the certain predefined condition). At least one of the preceding vehicle and the succeeding vehicle may be a self-driving vehicle (e.g., a self-driving truck or self-driving car) and the action may thus be a control action controlling the self-driving behavior of the vehicle, such as in order to prevent an accident, for example. The technique presented herein may not be limited to self-driving vehicles and may as such also relate to human-driven vehicles. It will thus be understood that the action may also comprise other control actions, such as displaying warning messages to the human drivers in the vehicles, for example.

If the relative positions are monitored repeatedly over time, the characteristics of the monitoring feed may be adapted to the circumstances as needed. For example, a frequency of determining the relative position of the preceding vehicle with respect to the succeeding vehicle may be adapted depending on at least one of a current speed of at least one of the preceding vehicle and the succeeding vehicle, a current road situation affecting at least one of the preceding vehicle and the succeeding vehicle, a driver profile of a driver of at least one of the preceding vehicle and the succeeding vehicle, and a configuration prescribed by a monitoring component (e.g., a configuration set by the monitoring component mentioned above).

As said, the method described herein may be performed by the computing unit 100, which may be a standalone computing unit or a computing unit provided in a cloud computing environment, for example. In one variant, the computing unit 100 may be an on-board computing unit and, as such, the method may be performed by an on-board computing unit of one of the preceding vehicle and the succeeding vehicle. In another variant, the method may be performed by a computing unit provided in a cloud computing environment. In the latter case, the computing unit in the cloud computing environment may be provided as a digital twin of the on-board computing unit of a respective vehicle so that the (local) on-board unit may act as a fallback unit that is always available, which may be required in situations when communication between the vehicle and the cloud is broken, for example. An on-board computing unit of at least one of the preceding vehicle and the succeeding vehicle may thus be provided as fallback computing unit configured to perform the method in case of a failure of the computing unit provided in the cloud computing environment. In case of a computing unit provided in the cloud computing environment, high-performance mobile communications systems, such as LTE or 5G systems, may be used to ensure reliable communication between the vehicles and the cloud. Each vehicle may comprise a corresponding gateway to provide connectivity with the cloud accordingly.

The computing unit in the cloud computing environment may additionally be used to collect the measurement data output by the monitoring feed and maintain a database acting as a state registry of the vehicle tags as well as of the determined relative positions and graphs, optionally with all relevant historical information. The cloud representation of the collected information may include local static information about the platooning system geometry, local static tag setting parameters, local state measurements, and ranging measurement results for creating the proximity graphs, for example. Given the high-performance and reliable communication between vehicles on the cloud, in some variants, each vehicle may have its own digital twin, wherein the platooning logic may be implemented separately for each vehicle in the cloud, so that the determined results may be used by each vehicle and its driving logic separately. The cloud computing unit may also create a common view of all vehicles in the platoon and may optionally use this information to create (e.g., real-time) status reports for the vehicle driving engines.

Figure 5:
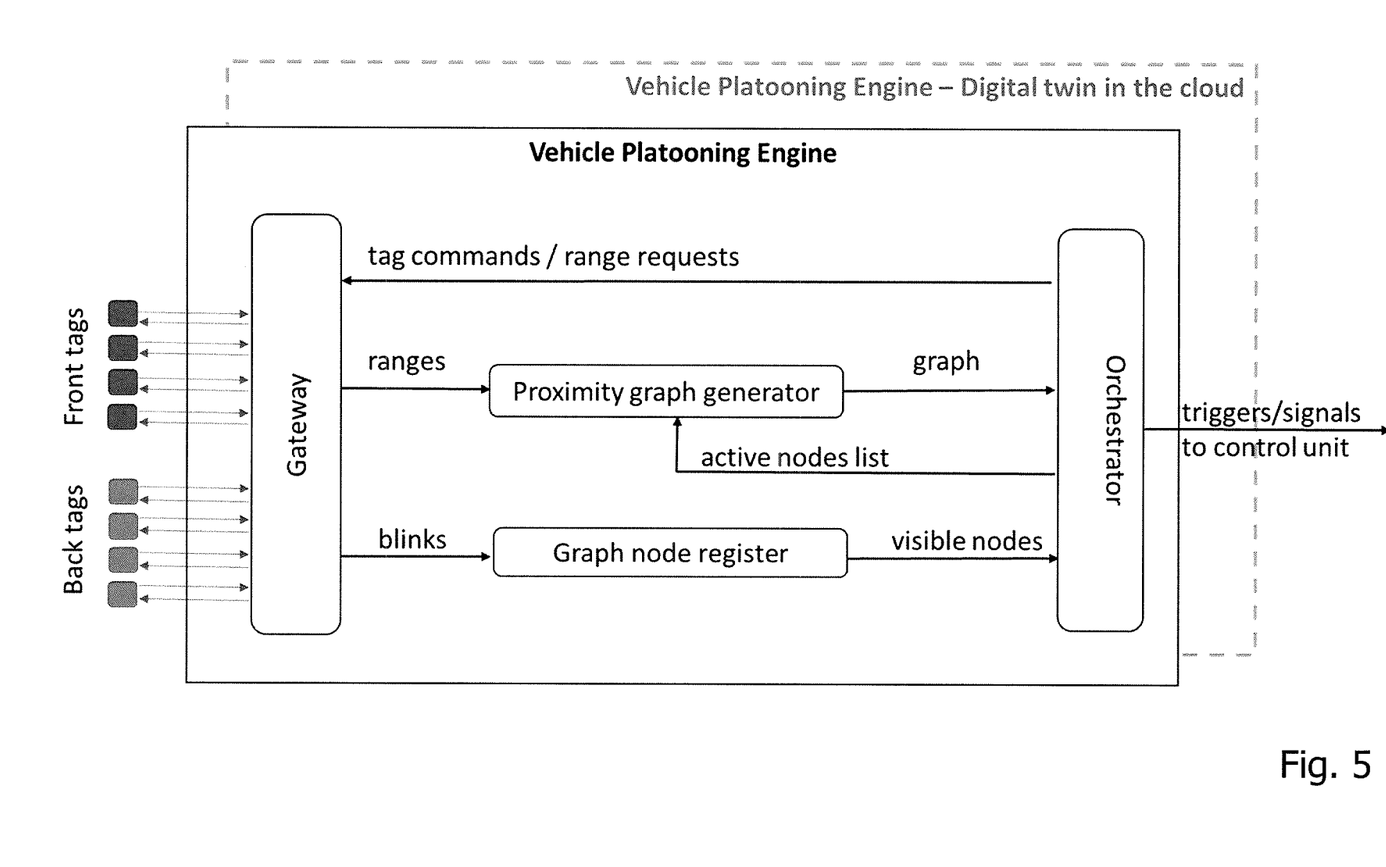
FIG. 5 illustrates an exemplary implementation of a computing unit provided as an on-board unit of a succeeding vehicle in a vehicle platoon.

FIG. 5 illustrates an exemplary implementation of the computing unit 100, called vehicle platooning engine (VPE). The computing unit 100 is locally provided as an on-board system of a succeeding vehicle that follows a preceding vehicle in a vehicle platoon. As indicated in the figure, the VPE may have a digital twin in a cloud, as described above. In the exemplary implementation, ranging measurements may be triggered by the front tags of the succeeding vehicle and the back tags of the preceding vehicle may broadcast their unique identifiers enriched by positional information and meta information about the preceding vehicle, as described above, using so called blink messages.

Within the VPE, a gateway module may receive ranging measurement data from the front tags of the vehicle as well as blink messages from the back tags of the preceding vehicle. The blink messages may be forwarded to a graph node register which may read the identifiers of the back tags from neighboring vehicles and create a list of visible nodes (e.g., tags with reliable radio communication and line-of-sight position), e.g., per predefined time window. The list of visible nodes may then be provided to an orchestrator module which may decide which of the visible nodes should be in an active nodes list, which the orchestrator module, in turn, provides to a proximity graph generator. The active nodes list may represent the list of tags that belong to the vehicles of the platoon and may not include other vehicles detected in the vicinity (e.g., overtaking vehicles that do not belong to the platoon). The orchestrator module may send tag commands and ranging requests to the front tags of the succeeding vehicle through the gateway module which, in return, may perform the requested ranging measurements with the selected neighboring back tags of the preceding vehicle and provide the results of the ranging measurements via the gateway module to the proximity graph generator. The proximity graph generator may process the ranging measurement results by carrying out a spatial analysis to determine the relative position between the preceding vehicle and the succeeding vehicle and generate a corresponding graph, as described above. Optionally, the ranging measurement results may be filtered based on the active nodes list. The up-to-date graph may be sent to the orchestrator module which may process the graph and create an output as part of a monitoring feed that may be used to trigger or signal control actions to be initiated by a control unit, for example. The orchestrator module may then send the next commands to restart the loop periodically. The integration of the VPE into existing control systems may be realized through custom adapter modules, for example.

As has become apparent from the above, the present disclosure provides a technique for determining a relative position of a preceding vehicle with respect to a succeeding vehicle in a vehicle platoon. The technique may be used for real-time monitoring of the relative positions between the vehicles in a platooning line. By introducing direct proximity measurements and using fixed tag device positions on the front and back of each vehicle, the number of measurements and the complexity of the required processing algorithms may be significantly reduced, without compromising detection accuracy. By using direct communication to tags identified from blink broadcast messages, the technique may save channel capacity which, in turn, may enable higher inter-vehicle measurement frequencies for better real-time monitoring. Proximity graph generators may be used for efficient geometrical calculations and active nodes detection may ensure a minimal set of distance measurements to detect the relative positions from the calculated graphs. All tags may have unique identifiers with meta information about their vehicle and their role within the system, which may determine their exact position within the graph.

As such, with respect to the prior art techniques mentioned above, the technique presented herein may particularly provide advantages as follows. The technique may be resistant to environmental sensitivity issues and may not be sensitive to sudden changes in light or weather conditions, for example. The technique may not require image processing, edge detection, feature extraction methods or model training for object detection and may as such not be sensitive to the varying visible shapes of the vehicles in front, as they may occur with varying truck loads, for example. Using direct measurements instead of inferred distances (e.g., from feature detection in LIDAR, radar or image processing systems) may significantly reduce error propagation and the uncertainty of the calculated relative positions. Using UWB technology may allow for centimeter level distance measurements and enable high-accuracy relative position monitoring that does not rely on active communication between the vehicles to synchronize their driving maneuvers, e.g., with alerts sent in advance of each turning, etc. The technique may not require high-volume point cloud data sets to be processed and, hence, a low delay monitoring feed may be provided. Also, the technique may be cost efficient since only a few inexpensive UWB tags may be necessary and the general architecture as well as the employed algorithms may be comparably simple. The technique may as such be easily integratable into existing vehicle control systems. The accuracy and certainty of the positioning monitoring may generally be set higher by provision of additional tags, if needed, or may be kept at a minimum for cost saving reasons. Moreover, the technique may not require extra communication channels since the same radio technology, such as UWB, may be used for both performing the measurements as well as reporting the measured data.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for determining a relative position of a preceding vehicle with respect to a succeeding vehicle in a vehicle platoon, the succeeding vehicle comprising at least two front tags and the preceding vehicle comprising at least two back tags, the front and back tags being configured to perform ranging measurements among each other using radio technology, the method comprising:
   determining pairwise distances between the front and back tags using ranging measurements performed by the front and back tags using the radio technology; and
   determining the relative position of the preceding vehicle with respect to the succeeding vehicle based on the determined pairwise distances.

2. The method of claim 1, wherein determining the relative position of the preceding vehicle with respect to the succeeding vehicle includes creating a graph based on the determined pairwise distances and determining the relative position based on a geometry of the graph.

3. The method of claim 1, wherein the front tags are installed at the succeeding vehicle according to a first geometrical arrangement with predefined relative positions of the front tags and wherein the back tags are installed at the preceding vehicle according to a second geometrical arrangement with predefined relative positions of the back tags.

4. The method of claim 3, wherein each of the front tags stores information regarding its position in the first geometrical arrangement of the succeeding vehicle and wherein each of the back tags stores information regarding its position in the second geometrical arrangement of the preceding vehicle.

5. The method of claim 4, further comprising:
   configuring the front tags and/or the back tags to broadcast the information stored on the respective tag using the radio technology.

6. The method of claim 5, further comprising:
   generating a list of visible tags among the front and back tags from which the broadcasted information is received, wherein the relative position of the preceding vehicle with respect to the succeeding vehicle is determined based on the pairwise distances among the visible tags.

7. The method of claim 6, wherein the list of visible tags is filtered to exclude tags of detected vehicles other than the preceding vehicle and the succeeding vehicle.

8. The method of claim 3, wherein each of the front and back tags stores information regarding at least one of:
   a unique identifier of the respective tag,
   a role of the respective tag, and
   the vehicle at which the respective tag is installed.

9. The method of claim 1, wherein the ranging measurements between the front and back tags are performed using ultra wideband (UWB) radio technology.

10. The method of claim 1, wherein the front and back tags report their ranging measurements using the radio technology.

11. The method of claim 1, wherein the ranging measurements are triggered by the front tags of the succeeding vehicle.

12. The method of claim 1, wherein determining the relative position of the preceding vehicle with respect to the succeeding vehicle based on the determined pairwise distances is performed repeatedly to monitor the relative position over time.

13. The method of claim 12, further comprising:
   providing a feed reflecting changes of the relative position of the preceding vehicle with respect to the succeeding vehicle over time to a monitoring component.

14. The method of claim 13, wherein the monitoring component is configured to generate an alert upon detecting that the relative position of the preceding vehicle with respect to the succeeding vehicle is abnormal, or is configured to control at least one of the preceding vehicle and the succeeding vehicle to perform an action upon detecting that the relative position of the preceding vehicle with respect to the succeeding vehicle is abnormal, or is configured to both generate an alert and control at least one of the preceding vehicle and the succeeding vehicle to perform an action, upon detecting that the relative position of the preceding vehicle with respect to the succeeding vehicle is abnormal.

15. The method of claim 1, wherein a frequency of determining the relative position of the preceding vehicle with respect to the succeeding vehicle is adapted depending on at least one of:
- a current speed of at least one of the preceding vehicle and the succeeding vehicle,
- a current road situation affecting at least one of the preceding vehicle and the succeeding vehicle,
- a driver profile of a driver of at least one of the preceding vehicle and the succeeding vehicle, and
- a configuration prescribed by a monitoring component.

16. The method of claim 1, wherein the method is performed by an on-board computing unit of one of the preceding vehicle and the succeeding vehicle.

17. The method of claim 1, wherein the method is performed by a computing unit provided in a cloud computing environment and wherein an on-board computing unit of at least one of the preceding vehicle and the succeeding vehicle is provided as fallback computing unit configured to perform the method in case of a failure of the computing unit provided in the cloud computing environment.

18. A non-transitory computer-readable medium comprising, stored thereupon, a computer program product comprising program code portions configured for execution by one or more computing devices and configured to cause the one or more computing devices to carry out the method of claim 1.

19. A computing apparatus for determining a relative position of a preceding vehicle with respect to a succeeding vehicle in a vehicle platoon, the succeeding vehicle comprising at least two front tags and the preceding vehicle comprising at least two back tags, the front and back tags being configured to perform ranging measurements among each other using radio technology, the computing apparatus comprising at least one processor and at least one memory, the at least one memory containing instructions executable by the at least one processor such that the computing unit is operable to perform the method of claim 1.

20. A system comprising a computing apparatus according to claim 19.

* * * * *